(12) United States Patent
Mooney (10) Patent No.: US 10,674,067 B2
(45) Date of Patent: *Jun. 2, 2020

(54) SPECTRAL, POLAR AND SPECTRAL-POLAR IMAGERS FOR USE IN SPACE SITUATIONAL AWARENESS

(71) Applicant: Solid State Scientific Corporation, Hollis, NH (US)

(72) Inventor: Jonathan Martin Mooney, Irvine, CA (US)

(73) Assignee: Solid State Scientific Corporation, Hollis, NH (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/824,661

(22) Filed: Nov. 28, 2017

(65) Prior Publication Data
US 2018/0191946 A1 Jul. 5, 2018

Related U.S. Application Data

(63) Continuation-in-part of application No. 13/900,768, filed on May 23, 2013, now Pat. No. 9,835,491.
(Continued)

(51) Int. Cl.
| | |
|---|---|
| *G01J 3/28* | (2006.01) |
| *H04N 5/232* | (2006.01) |
| *H04N 5/225* | (2006.01) |
| *G02B 27/09* | (2006.01) |
| *G02B 27/28* | (2006.01) |

(Continued)

(52) U.S. Cl.
CPC ........ *H04N 5/23212* (2013.01); *G01J 3/0208* (2013.01); *G01J 3/0224* (2013.01); *G01J 3/2803* (2013.01); *G01J 3/2823* (2013.01); *G01J 3/447* (2013.01); *G02B 3/0056* (2013.01); *G02B 27/0961* (2013.01); *G02B 27/283* (2013.01); *H04N 5/2258* (2013.01)

(58) Field of Classification Search
CPC .................................................. G01J 3/2823
See application file for complete search history.

(56) References Cited

U.S. PATENT DOCUMENTS

9,835,491 B1 * 12/2017 Mooney ................ G01J 3/0205
2004/0131147 A1 7/2004 Bowen et al.
(Continued)

*Primary Examiner* — Thanh Luu
(74) *Attorney, Agent, or Firm* — Louis J. Franco; Law Office of Louis J. Franco (57) ABSTRACT

An imager for imaging a plurality of images of a single scene over a plurality of disparate electromagnetic wavelength sets includes front-end optics for outputting a polychromatic, collimated image beam of the scene; a beam displacer configured for splitting the collimated image beam into spatially displaced, mutually parallel beams, and an imaging-sensor array configured for registration of the spatially displaced wavelength sets at disparate locations along the imaging-sensor array. In alternative versions, the beam displacer displaces constituent light beams based on at least one of wavelength and polarization. In various implementations, a back-end focusing element focuses each constituent beam onto a predetermined location along the imaging-sensor array. The imaging-sensor array is optimally configured for simultaneous sampling of the plural images focused thereupon by the back-end focusing elements.

10 Claims, 6 Drawing Sheets

Related U.S. Application Data

(60) Provisional application No. 61/650,811, filed on May 23, 2012.

(51) Int. Cl.
  *G01J 3/02*   (2006.01)
  *G01J 3/447*  (2006.01)
  *G02B 3/00*   (2006.01)

(56) References Cited

U.S. PATENT DOCUMENTS

| | | | |
|---|---|---|---|
| 2006/0072109 A1* | 4/2006 | Bodkin | G01J 3/02 356/328 |
| 2006/0121375 A1 | 6/2006 | Tsacoyeanes et al. | |
| 2008/0316584 A1 | 12/2008 | Kubo et al. | |
| 2011/0206291 A1 | 8/2011 | Kashani et al. | |
| 2012/0268745 A1 | 10/2012 | Kudenov | |

* cited by examiner

SPECTRAL, POLAR AND SPECTRAL-POLAR IMAGERS FOR USE IN SPACE SITUATIONAL AWARENESS

CROSS-REFERENCE TO RELATED APPLICATION/PRIORITY CLAIMS

The present application is a continuation-in-part of U.S. Non-Provisional application Ser. No. 13/900,678 filed May 23, 2013 under the title "SPECTRAL, POLAR AND SPECTRAL-POLAR IMAGERS FOR USE IN SPACE SITUATIONAL AWARENESS," and which, as of the filing date of the present application, was still before the US Patent and Trademark Office and scheduled to issue on Dec. 5, 2017 as U.S. Pat. No. 9,835,491. U.S. application Ser. No. 13/900,678 in turn claimed priority based on U.S. Provisional Application Ser. No. 61/650,811 filed May 23, 2012 under the title "SPECTRAL, POLAR AND SPECTRAL-POLAR IMAGERS FOR USE IN SPACE SITUATIONAL AWARENESS."

The present application claims the benefit of the filing date of Provisional Application Ser. No. 61/650,811, as well as the filing date of U.S. Non-Provisional application Ser. No. 13/900,678, based on the priority chain outlined above. Moreover, the entireties of the disclosures, including the drawings, of both of the previous applications in the aforesaid priority chain are incorporated herein by reference as if set forth fully in the present application.

BACKGROUND

In Space Situational Awareness (SSA), distant and dim unresolved objects are evaluated to assess configuration, activity and level of threat. Observed signatures depend on the specific illumination and viewing conditions, the materials of the space-borne object and the object orientation. Since the object is unresolved, characterization is often limited to analysis of the resulting (or, a resultant) light curve, which represents the temporal signature variations. The observed signature, or light curve, associated with an object changes as that object spins or otherwise changes in time. This temporal evolution of the light curve provides a fingerprint which can be used to assess the state of the satellite (object). While increasing the integration time may be used to increase the signal of dim objects, the integration time is limited by the temporal resolution required to resolve salient features of the light curve, thus placing a premium on sensor efficiency.

Although light curves are established as a powerful tool in SSA, other aspects of optical wavefronts, beyond the reach of traditional SSA, remain unexploited. Accordingly, a need exists for a high-efficiency approach to spectral imaging that augments light curve analysis with spectral information, an approach conceived specifically with the efficiency and temporal sampling requirements of SSA in mind, with the goal of extracting as much information as possible from the optical wavefronts presented by distant, dim unresolved objects.

SUMMARY

Various implementations of the present invention provide an efficient method for spectral imaging with an astronomical telescope. In each of various configurations, a coupling optic is employed to form a displaced image of the pupil across an array of lenslets. Each of the lenslets forms an image in a unique spectral band (hereinafter, referred to alternatively as "wavelength set"), and the array of lenslets forms a multi-spectral image. Alternatively implemented, this configuration provides snapshot-mode spectral imagery with high photon collection efficiency that is scalable to ten or more spectral bands.

An approach alternative to that described above relative to spectral imaging is configured as a polar imager by using a birefringent material to displace the beam (s) based on polarization instead of wavelength. In one illustrative such configuration, only two lenslets are used to form two images. The argument for using this approach for polar imaging alone is not very compelling since alternative optical configurations that form two images are readily available. However, a spectral-polar imager is envisioned according to which the spectral and polar beam displacement techniques are combined in a single instrument. In accordance with at least one such configuration, the axis of spectral displacement is orthogonal—or at least non-parallel—to that of polar displacement. As with the spectral imaging implementation, this latter approach to spectral-polar imaging is advantageous because it provides snapshot-mode spectral imagery with high photon collection efficiency that is scalable to several (e.g., ten or more) spectral bands in each of two polarizations.

One implementation prescribes altering the functionality of a conventional telescope by adding an optical assembly after the focal plane. The additional optics include a collimator, a beam displacer and a lenslet array. An imaging-sensor array (e.g., conventional focal plane array) is positioned at the image plane of the lenslet array, and can comprise, for example, a CCD or CMOS array appropriate for the spectral band of interest. An imaging-sensor array capable of snapshot mode integration facilitates simultaneous sampling.

The collimator images the entrance pupil of the telescope onto the plane of the lenslet array. The focal length of the collimator is configured so that the image of the pupil is approximately the same size as one of the individual lenslet apertures. The f-number of the collimator matches that of the telescope, while the field of view is less than or equal to that of the telescope.

The beam displacer displaces the parallel pencils of light based on wavelength, polarization or both. Ideally, the beam displacer introduces only displacement and no net angular deviation into the rays since angular deviation will introduce chromatic blur into the resulting imagery, thereby degrading performance.

The lenslet array is placed at plane of the exit pupil of the collimator. While the lenslets are similar with the same magnification and f-number, they are not necessarily identical. Each may be tuned as appropriate for the specific wavelength set and polarization being imaged. Baffling between the lenslets is not critical since a field stop can be used to limit image size, thereby preventing image overlap. Spectral filters are not required, but may be used to sharpen band edges or reject unwanted diffraction orders.

The technical approach to spectral imaging is to displace the image of the stop in parallel space and then form multiple images by using a lens array. Spectral displacement is achieved by a set of dispersers (for example, a pair of gratings, a pair of prisms or a pair of grisms) comprising first and second optically-dispersive elements that are spatially separated and arranged (oriented) so that dispersion introduced by the first disperser is canceled by the second disperser. The first disperser spectrally deviates the initial polychromatic beam. The spectral beams diverge as they propagate away from the first disperser, and the angular deviation is "corrected" at the second disperser, leaving a net spatial displacement as a function of wavelength.

Figure 4:
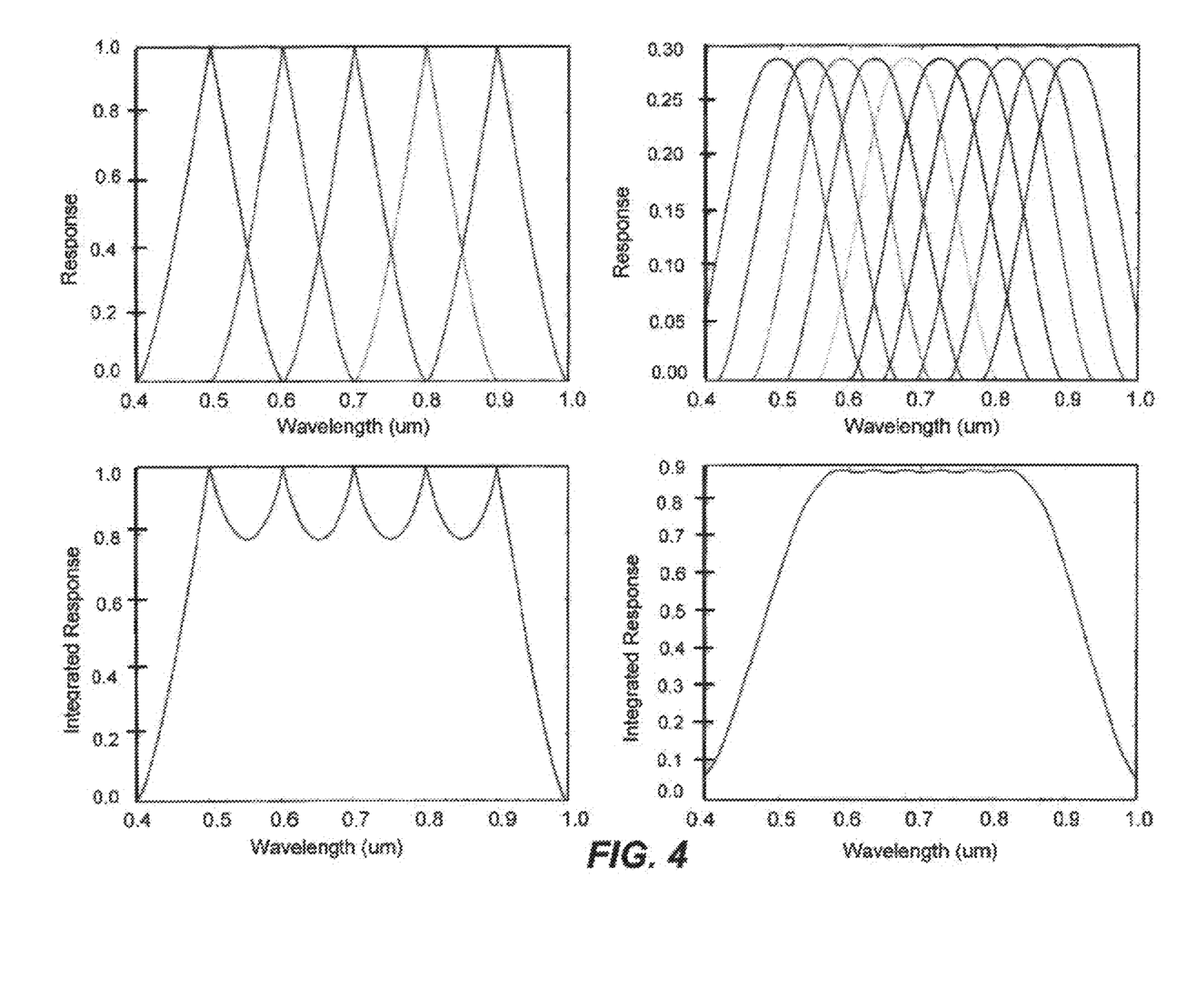
FIG. 4 includes comparative graphical representations of the filter response of a linear lenslet array versus a close-pack lenslet array such as those shown in, respectively, FIGS. 2 and 3.

The collimated light beams—now spatially separated based on wavelength—incident on the lenslet array are focused to a common (i.e., shared) imaging-sensor array, which can be used for simultaneous sampling of the plural wavelength-specific images. Since dispersion is canceled by the optically-dispersive elements, residual color is minimized, if not eliminated, in the images projected by the lenslet array onto the imaging-sensor array. The spectral response of each of a plurality of sensor channels is given by the integration of the spectrally dependent pupil function with the aperture of the lenslet array. The response when the image of the stop is the same size as the lenslet aperture is shown for a five-aperture linear array in the left panel of FIG. 4. The response when the image of the stop just fills a ten-aperture close-pack array is shown on the right of FIG. 4. The linear configuration has less channel to channel crosstalk and higher ideal peak efficiency, since the image of the stop matches to the lenslet aperture at one wavelength; however, the close-pack configuration has higher average efficiency, since there is less dead space at the aperture array. The ideal efficiency for a close-pack array of infinite extent is $\pi \cdot \cos(30)/3 = 0.9069$, which is the upper limit of the efficiency. In practice the spectral response will be limited by pupil aberrations.

Stray light and crosstalk can be controlled by placing a field stop at the image plane of the telescope. The crosstalk of each configuration can be improved by incorporating spectral filters at the lenslet array apertures. These filters could also be used to reject higher diffraction orders; however, with some loss in efficiency.

Figure 5:
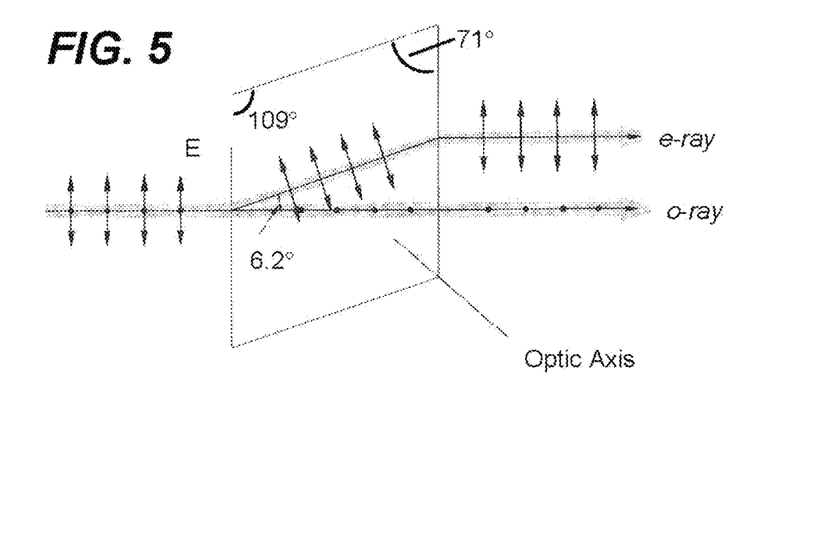
FIG. 5 is a schematic representation in which a light beam is split by a birefringent material (e.g. crystal) into two displaced light beams (a light beam with two orthogonal field components) based on polarization instead of wavelength band.
Figure 6:
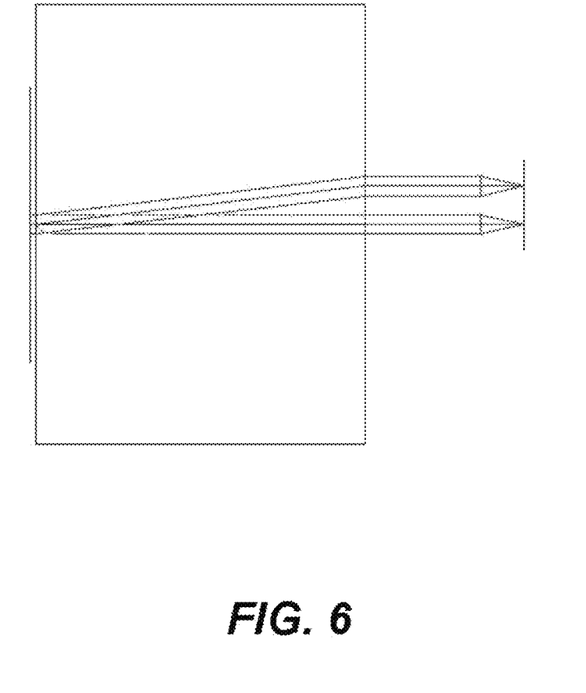
FIG. 6 shows the two beams of FIG. 5 being focused onto an imaging-sensor array.

Alternative implementations apply to polar imaging an approach that is analogous to that described relative to spectral imaging in that the incident optical image beam is displaced based on polarization and a plurality of focusing elements (e.g., lenslets) is used to from multiple images. In various illustrative configurations, polar displacement is achieved using a birefringent crystal (e.g., calcite, quartz or sapphire) in place of the disperser pair in the spectral imager. A collimated input beam leads to two collimated, linearly polarized output beams that are displaced from one another. A two-element lenslet array then forms images for each beam. FIGS. 5 and 6 illustrate beam displacement through birefringent materials based on polarization. The polar separation and resolution are distinct from their spectral counterparts, since there are only two linear polarization states. There is no fundamental reason that the polar separation can't be complete.

Figure 3:
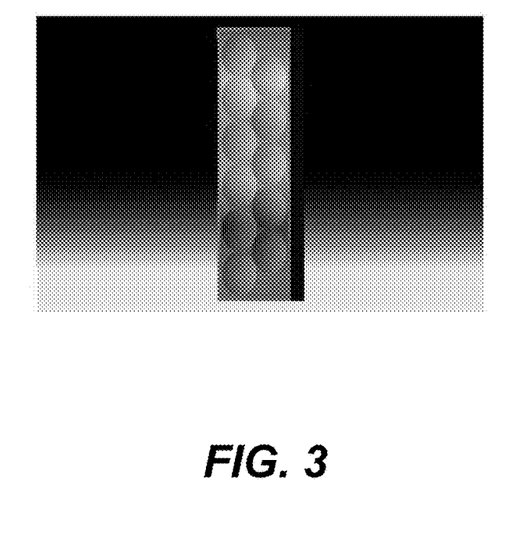
FIG. 3 depicts a lenslet array with a "close-pack" configuration in association with a spectral analysis system such as the system of FIG. 1.
Figure 7:
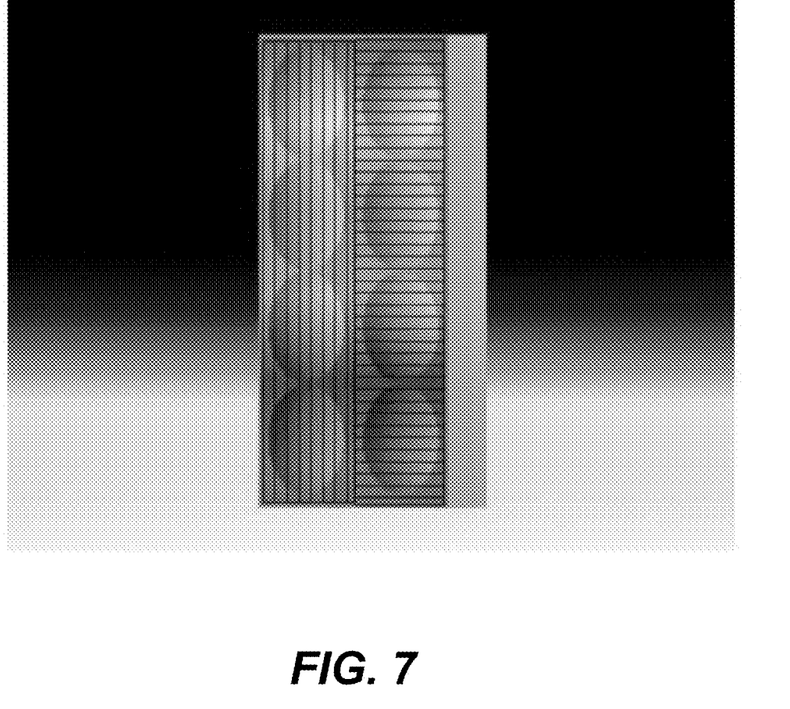
FIG. 7 shows an illustrative lenslet array for use in association with an imaging system that splits an inputted polychromatic light beam into discrete beams based on both wavelength (spectral separation is vertical) and polarization (polar separation is horizontal) of the constituent light within the input beam.
Figure 8:
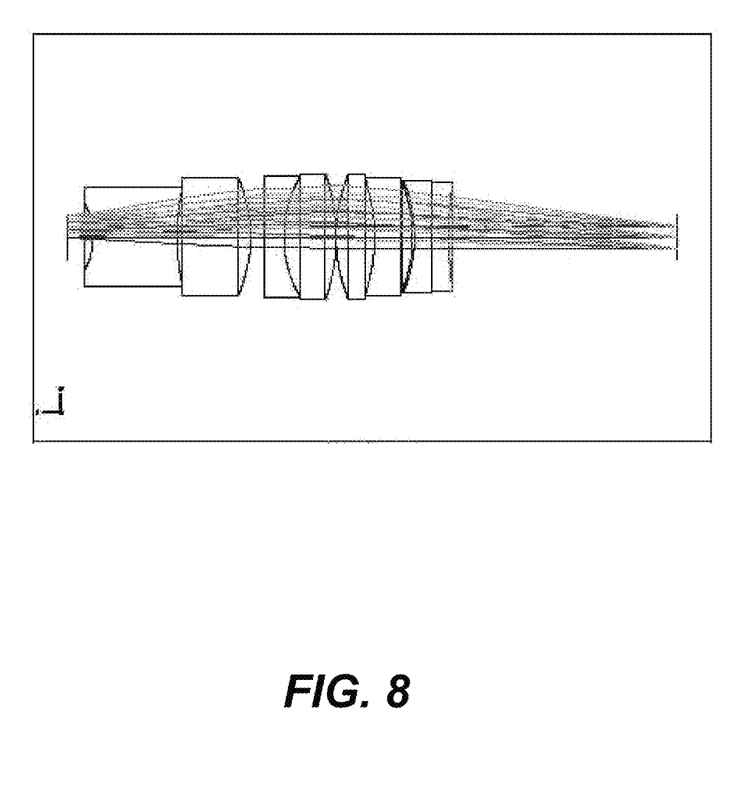
FIG. 8 schematically depicts the optical coupling of a collimator with a telescope.

As previously indicated, various embodiments combine spectral and polar beam displacement techniques in a single instrument. In one illustrative implementation, spectral-polar imaging is achieved by fabricating transmission gratings on the opposing faces of a parallel plate made of birefringent material where the optical axis is selected so the extraordinary rays are displaced in the direction perpendicular to the dispersion direction of the grating. In one such embodiment, the lens array consists of two spectral arrays situated in a side-by-side relationship, as shown, for example, in FIG. 7. An analogous configuration implementing a close-pack array, such as that in FIG. 3, is also envisioned within the scope and contemplation of the invention.

An important enabling element of various embodiments is a collimator lens, which performs three key functions: 1) collimating the image beam outputted from the telescope, 2) imaging the pupil aperture onto the lenslet array, and 3) providing the space for the beam displacer. The collimator should be chromatically well-corrected, distortion free and diffraction limited. The focal length of the collimator is given by the diameter of the lenslet aperture and the f-number of the telescope. By way of specific, non-limiting example, for the MRO telescope with a large-format visible FPA, the "perfectly-coupled" collimator will have a focal length of about 30 mm at f/8.7 with a 120 degree FOV. In this specific case, in order to provide space for the beam displacer, the stop must be placed approximately 30 mm from the last lens element. At the same time, the last lens element must encompass the required 120 degree FOV. The result is a 30 mm focal length lens with a minimum clear aperture diameter of 100 mm.

An alternative method of performing spectral imaging by optically coupling a telescope to a lenslet array is envisioned. The approach disperses the image of the pupil, then forms parallel images with the lenslet array. This approach promises superior efficiency, which may add value in low light conditions. However, the field of view that can be obtained may be limited. This latter approach also promises a relatively straightforward extension to polar and spectral polar imaging.

Representative, non-limiting implementations are more completely described and depicted in the following detailed description and the accompanying drawings.

DETAILED DESCRIPTION

The following description of apparatus for and methods of analyzing the spectral signature of an imaged scene is illustrative in nature and is therefore not intended to limit the scope of the invention or its application of uses.

Figure 1:
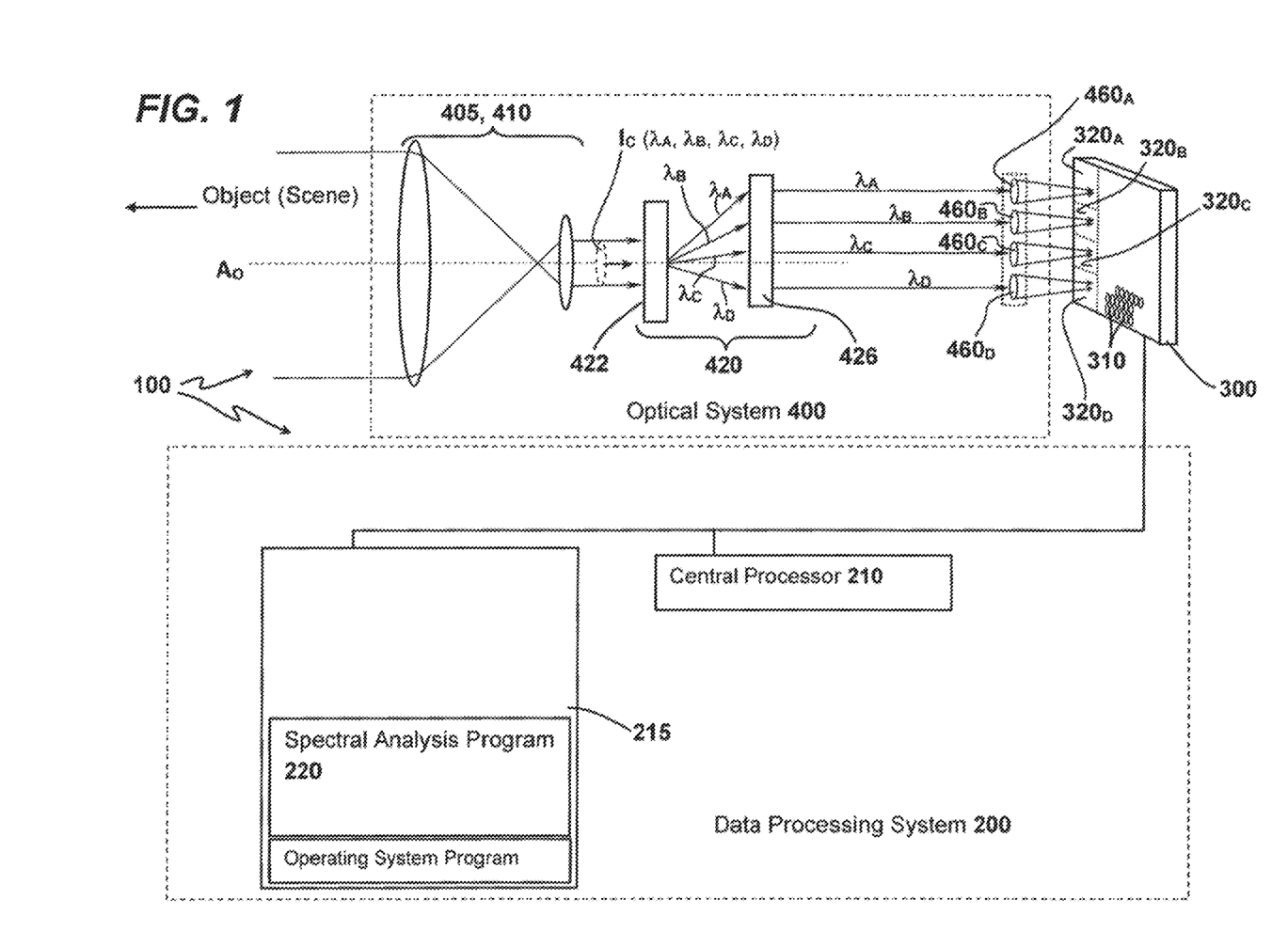
FIG. 1 schematically depicts the architecture of an illustrative spectral analysis system and the action of a beam displacer that is incorporated within the spectral analysis system and displaces wavelength sets within a polychromatic beam into discrete beams based on wavelength.

Referring to FIG. 1, the architecture of an illustrative spectral analysis system 100 is schematically represented and includes (i) a data processing system 200; (ii) an imaging-sensor array 300 communicatively linked to the data processing system 200 and (iii) an optical system 400 configured for imaging electromagnetic energy emitted from a scene or source event object source event (not shown) external to the optical system 400 onto the imaging-sensor array 300.

The data processing system includes a central processor 210 and a memory 215 and is programmed to execute spectral analysis algorithms 220 as described in more detail further in this description. Alternative implementations incorporate any of a variety of conventional imaging sensor arrays 300 configured to detect wavelengths over a predetermined range of electromagnetic wavelengths. An illustrative non-limiting example of an imaging-sensor array 300 suitable to the illustrative implementation under consideration includes arrayed detectors 310.

The optical system 400 schematically represented in the illustrative implementation of FIG. 1 includes front-end optics 405 optically aligned with an optical beam displacer 420. The front-end optics 405 are configured for outputting a polychromatic, collimated image Ic of a selected scene. In the version of FIG. 1, the front-end optics 405 are schematically represented as a telescope 410 only by way of non-limiting example; alternative arrangements fulfilling the same collimating function are within the scope and contemplation of the invention.

The optical beam displacer 420 in the particular version of FIG. 1 includes first and second optically-dispersive elements 422 and 426. The first optically-dispersive element 422 is spatially situated for receiving the collimated image Ic and angularly dispersing constituent wavelength sets within the received collimated image Ic such that the wavelength sets angularly diverge away from the first optically-dispersive element 422 toward the second optically-dispersive element 426. For purposes of explanation, four illustrative wavelength sets (i.e., $\lambda_A$, $\lambda_B$, $\lambda_C$, and $\lambda_D$) are considered. Moreover, the path of each of wavelength sets $\lambda_A$, $\lambda_B$, $\lambda_C$, and $\lambda_D$ is represented schematically by appropriately labeled ray trace lines.

Referring still to FIG. 1, the second optically-dispersive element 426 is spatially situated for receiving the wavelength sets $\lambda_A$, $\lambda_B$, $\lambda_C$, and $\lambda_D$ dispersed by the first optically-dispersive element 422 and reducing the degree of mutual angular divergence, while maintaining mutual spatial displacement, among the wavelength sets $\lambda_A$, $\lambda_B$, $\lambda_C$, and $\lambda_D$. More specifically, the first optically-dispersive element 422 introduces desired separation of the polychromatic light within the collimated image Ic into spatially-separated, discrete wavelength sets. However, if these wavelength sets impinge upon the plane of the imaging-sensor array 300 at angles substantially deviant from perpendicular, an unacceptably high degree of chromatic blur will be introduced into the resultant imagery. Accordingly, the second optically-dispersive element 426 serves to "undo" or "cancel" as much as practicable the angular deviation introduced by the first optically-dispersive element 422. In an ideal embodiment, the wavelength sets $\lambda_A$, $\lambda_B$, $\lambda_C$, and $\lambda_D$ would propagate toward the imaging-sensor array 300 along mutually parallel axes (ray trace lines), and impinge orthogonally upon the imaging-sensor array 300. In this sense, the light, while divided into discrete wavelength sets $\lambda_A$, $\lambda_B$, $\lambda_C$, and $\lambda_D$ is re-collimated.

It will be readily understood that the beam displacer 420 can achieve beam displacement with alternative optical elements, and that the labeled "boxes" in the drawings are merely schematic representations of optically-dispersive elements 422 and 426. Illustrative examples of alternative optically-dispersive elements suitable for implementation within the beam displacer 420 include prisms, diffraction gratings and "grisms," the latter being hybrid elements having both diffractive and refractive properties. Accordingly, it is to be understood that, in alternative embodiments, the physical phenomena responsible for the dispersion may include (i) refraction, (ii) diffraction, and/or (iii) some combination of these. These phenomena, and their physical explanations and distinctions, are well-known to those of ordinary skill in the art to which the invention pertains. However, it is worth at least noting that, wherein refraction is a function of frequency/wavelength-dependent velocity of light through an optical medium, diffraction is essentially an interference-based phenomenon. In classical physics, for example, the diffraction phenomenon is described as the interference of waves according to the Huygens-Fresnel principle. These characteristic behaviors are exhibited when a wave encounters an obstacle or a slit that is comparable in size to its wavelength.

The illustrative embodiment of FIG. 1 further includes a plurality of back-end optical focusing elements 460. Each focusing element 460 is optically aligned for projecting (focusing) upon a corresponding unique location 320 along the imaging-sensor array 300 the electromagnetic wavelengths associated with one of the spatially displaced wavelength sets $\lambda_A$, $\lambda_B$, $\lambda_C$, and $\lambda_D$. For clarity in the description and associated drawings (including FIG. 1), each optical focusing element is identified by a reference character including the number "460" that identifies it generally as an optical focusing element, followed by a capital letter (e.g., A, B, C . . . ) identifying it more specifically as being associated with the projection of a particular wavelength set (e.g., $\lambda_A$, $\lambda_B$, $\lambda_C$, etc.) upon a corresponding location (or section) 320 of the imaging-sensor array 300. Similarly, each imaging-array section 320 upon which the wavelengths of a wavelength set $\lambda_A$, $\lambda_B$, $\lambda_C$ or $\lambda_D$ are focused is referenced by a set of characters including the number "320," identifying it as an imaging-array section, followed by a capital letter (e.g., A, B, C . . . ) identifying it more specifically as being associated with the detection of a particular one of wavelength sets $\lambda_A$, $\lambda_B$, $\lambda_C$, and $\lambda_D$. In FIG. 1, imaging-array sections 320 are delineated from one another by dashed boundaries. When referred to collectively or non-specifically in this description, the imaging-array sections 320 and focusing elements 460 are referenced without alphabetic characters, despite the fact that no such "collective" or "generalized" reference character is used in the drawings.

Figure 2:
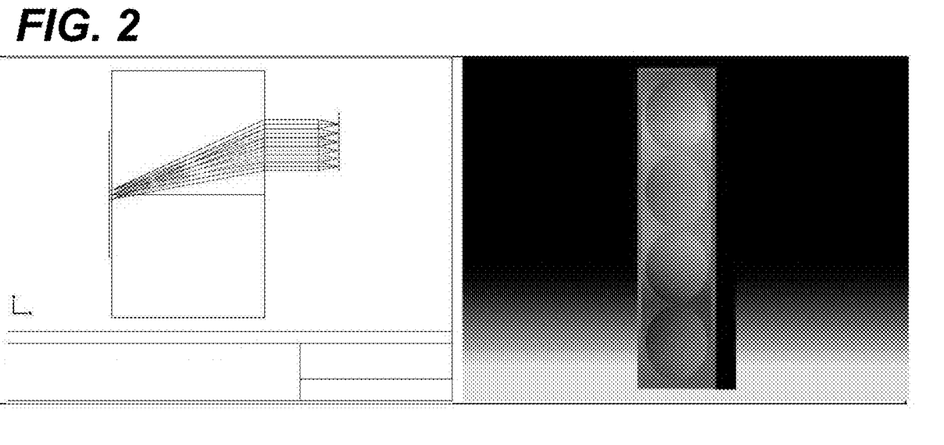
FIG. 2 shows an illustrative linearly configured lenslet array for use in association with a spectral analysis system such as the system of FIG. 1.

The optical focusing elements 460 of various versions are alternatively arranged and "packaged." However, the use of a lenslet array is advantageous because the focusing elements 460 are then incorporated into a relatively robust unitary structure. The focusing elements 460 of FIG. 1 are illustratively incorporated as part of a lenslet array 470 schematically indicated by a generic dashed-line box encompassing the focusing elements 460. The lenslet array 470 can be alternatively configured; an illustrative linear configuration is shown in FIG. 2, while a "close-pack" configuration is shown in FIG. 3.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. An imager for imaging a plurality of spatially-correlated images of a single scene over a plurality of disparate electromagnetic wavelength sets representing correspondingly disparate color bands, the apparatus comprising:
   front-end optics configured for outputting a polychromatic, collimated image of a selected scene;
   a first optically-dispersive element spatially situated for receiving the collimated image and dispersing disparate constituent wavelength sets within the received collimated image such that the disparate constituent wavelength sets mutually angularly diverge away from the first optically-dispersive element, wherein the mutual angular divergence of the electromagnetic wavelength sets results from the optical phenomenon of diffraction such that the paths of the constituent wavelength sets within the received collimated image are bent by the first optically-dispersive element to different angles and the colors represented by the disparate constituent wavelength sets are mutually angularly separated;
   a second optically-dispersive element spatially situated for receiving the wavelength sets dispersed by the first optically-dispersive element and reducing the degree of mutual angular divergence, while maintaining mutual spatial displacement, among the wavelength sets, wherein the reduction in mutual angular divergence imparted by the second optically-dispersive element also results from the optical phenomenon of diffraction;
   an imaging-sensor array configured for registration of the spatially displaced wavelength sets at disparate locations along the imaging-sensor array; and
   a plurality of back-end optical focusing elements, each focusing element aligned for focusing upon a corresponding location on the imaging-sensor array the electromagnetic wavelengths associated with one of the spatially displaced wavelength sets.

2. The imager of claim 1 further comprising an optical polarizer for displacing the collimated light based on polarization.

3. The imager of claim 1 wherein
   (i) the front-end optics have associated therewith an exit pupil;
   (ii) each optical focusing element has associated therewith a focusing-element entrance aperture; and
   (iii) the focusing-element entrance aperture of each optical focusing element is at least as large as the exit pupil of the front-end optics.

4. An imager for imaging a plurality of spatially-correlated images of a single scene over a plurality of disparate electromagnetic wavelength sets representing correspondingly disparate color bands, the apparatus comprising:
   front-end optics configured for outputting a polychromatic, collimated image of a selected scene;
   a first optically-dispersive element spatially situated for receiving the collimated image and dispersing disparate constituent wavelength sets within the received collimated image such that the disparate constituent wavelength sets mutually angularly diverge away from the first optically-dispersive element, wherein the mutual angular divergence of the electromagnetic wavelength sets results from the optical phenomenon of diffraction such that the paths of the constituent wavelength sets within the received collimated image are bent by the first optically-dispersive element to different angles and the colors represented by the disparate constituent wavelength sets are mutually angularly separated;
   a second optically-dispersive element spatially situated and oriented for receiving the wavelength sets dispersed by the first optically-dispersive element and canceling the mutual angular divergence, while maintaining mutual spatial displacement, among the wavelength sets, wherein the cancellation of the mutual angular divergence imparted by the second optically-dispersive element also results from the optical phenomenon of diffraction;
   an imaging-sensor array configured for registration of the spatially displaced wavelength sets at disparate locations along the imaging-sensor array; and
   a plurality of back-end optical focusing elements, each focusing element aligned for focusing upon a corresponding location on the imaging-sensor array the electromagnetic wavelengths associated with one of the spatially displaced wavelength sets.

5. The imager of claim 4 further comprising an optical polarizer for displacing the collimated light based on polarization.

6. The imager of claim 4 wherein
   (i) the front-end optics have associated therewith an exit pupil;
   (ii) each optical focusing element has associated therewith a focusing-element entrance aperture; and
   (iii) the focusing-element entrance aperture of each optical focusing element is at least as large as the exit pupil of the front-end optics.

7. An imager for imaging a plurality of spatially-correlated images of a single scene over a plurality of disparate electromagnetic wavelength sets representing correspondingly disparate color bands, the apparatus comprising:
   front-end optics configured for outputting a polychromatic, collimated image of a selected scene;
   a first optically-dispersive element spatially situated for receiving the collimated image and dispersing disparate constituent wavelength sets within the received collimated image such that the disparate constituent wavelength sets mutually angularly diverge away from the first optically-dispersive element, wherein the mutual angular divergence of the electromagnetic wavelength sets results from at least one of the optical phenomena of (i) diffraction and (ii) refraction such that the paths of the constituent wavelength sets within the received collimated image are bent by the first optically-dispersive element to different angles and the colors represented by the disparate constituent wavelength sets are mutually angularly separated;
   a second optically-dispersive element spatially situated for receiving the wavelength sets dispersed by the first optically-dispersive element and reducing the degree of mutual angular divergence, while maintaining mutual spatial displacement, among the wavelength sets, wherein the reduction in mutual angular divergence imparted by the second optically-dispersive element also results from at least one of the optical phenomena of (i) diffraction and (ii) refraction;
   an imaging-sensor array configured for registration of the spatially displaced wavelength sets at disparate locations along the imaging-sensor array; and
   a plurality of back-end optical focusing elements, each focusing element aligned for focusing upon a corresponding location on the imaging-sensor array the electromagnetic wavelengths associated with one of the spatially displaced wavelength sets.

8. The imager of claim 7 wherein
(i) the front-end optics have associated therewith an exit pupil;
(ii) each optical focusing element has associated therewith a focusing-element entrance aperture; and
(iii) the focusing-element entrance aperture of each optical focusing element is at least as large as the exit pupil of the front-end optics.

9. The imager of claim 8 further comprising an optical polarizer for displacing the collimated light based on polarization.

10. The imager of claim 7 further comprising an optical polarizer for displacing the collimated light based on polarization.

* * * * *